United States Patent
Alerwi et al.

(10) Patent No.: US 12,398,639 B2
(45) Date of Patent: Aug. 26, 2025

(54) ADJUSTING OIL AND GAS PRODUCTION BASED ON CARBON ENVIRONMENTAL IMPACT

(71) Applicant: Saudi Arabian Oil Company, Dhahran (SA)

(72) Inventors: Maher Hamed Alerwi, Dhahran (SA); Christian Canto Maya, Dhahran (SA); Layan Alaeddin AlSharif, Dhahran (SA); Nada Ibrahim Alruwaii, Tarut (SA); Hamad Al Saiari, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 472 days.

(21) Appl. No.: 17/959,039

(22) Filed: Oct. 3, 2022

(65) Prior Publication Data
US 2024/0117731 A1   Apr. 11, 2024

(51) Int. Cl.
*E21B 47/117* (2012.01)
*G05B 23/02* (2006.01)

(52) U.S. Cl.
CPC ........ *E21B 47/117* (2020.05); *G05B 23/0286* (2013.01); *E21B 2200/20* (2020.05)

(58) Field of Classification Search
None
See application file for complete search history.

(56) References Cited

U.S. PATENT DOCUMENTS

| | | |
|---|---|---|
| 5,206,818 A | 4/1993 | Speranza |
| 8,717,183 B2 | 5/2014 | Pal et al. |
| 9,500,554 B2 | 11/2016 | Kulkarni et al. |

(Continued)

FOREIGN PATENT DOCUMENTS

| | | |
|---|---|---|
| CN | 101255952 | 9/2008 |
| CN | 113626749 A * | 11/2021 |

(Continued)

OTHER PUBLICATIONS

CN113626749A translation (Year: 2021).*

(Continued)

*Primary Examiner* — Lina Cordero
(74) *Attorney, Agent, or Firm* — Fish & Richardson P.C.

(57) ABSTRACT

The present disclosure describes methods and systems, including computer-implemented methods, computer program products, and computer systems, for determining carbon environmental impact for oil and gas pipeline leakages. One computer-implemented method includes: determining, by one or more hardware processors, an amount of Equivalent Carbon Dioxide (ECO2) associated with a pipeline leak in a hydrocarbon reservoir; determining, by one or more hardware processors, a probability of failure of the pipeline leak in the hydrocarbon reservoir; determining, by one or more hardware processors, an environmental consequence factor of the pipeline leak in the hydrocarbon reservoir; determining, by one or more hardware processors, a severity factor of the pipeline leak in the hydrocarbon reservoir based on at least one of the amount of ECO2, the probability of failure, or the environmental consequence factor; and outputting, by one or more hardware processors, the severity factor in a user interface.

18 Claims, 5 Drawing Sheets

(56) References Cited

U.S. PATENT DOCUMENTS

| | | | |
|---|---|---|---|
| 9,791,345 | B2 | 10/2017 | Schaefer et al. |
| 2005/0134859 | A1 | 6/2005 | Kalayeh et al. |
| 2015/0278407 | A1 | 10/2015 | Vennelakanti et al. |
| 2019/0331301 | A1 | 10/2019 | Du et al. |

FOREIGN PATENT DOCUMENTS

| | | |
|---|---|---|
| GB | 2589157 | 5/2021 |
| JP | 5474268 | 4/2014 |
| JP | 5783541 | 9/2015 |

OTHER PUBLICATIONS

Lehikoinen, A. et al., "Probabilistic Risk Assessment and Decision Support Tools for the Evaluation of Oil Transport in the Gulf of Finland, North-Eastern Baltic Sea" International Congress on Environmental Modelling and Software. 362 (Year: 2012).*

Loizzo, M .. , Akemu, O.A.P.. A.P., Jammes, L .. , Desroches, J .. , Lombardi, S.. , and A.. Annunziatellis. âQuantifying the Risk of CO2 Leakage Through Wellbores.â SPE Drill & Compl 26 (2011): 324â331. doi: https://doi.org/10.2118/139635-PA (Year: 2011).*

API Compendium of Greenhouse Gas Emissions Methodologies for the Oil and Natural Gas Industry, American Petroleum Institute, Aug. 2009, 807 pages.

API recommended Practice 1160, Managing System Integrity for Hazardous Liquid Pipelines, 2019, 1 page.

Campbell et al., "Methane emissions from the natural gas industry, vol. 9: underground pipelines," United States Environmental Protection Agency, Jun. 1996, 100 pages.

Etkin, "Risk Assessment of Oil Spills to US Inland Waterways," Environmental Research Consulting, 2006, 15 pages.

Huang et al., "Carbon footprint of oil products pipeline transportation," Science of the Total Environment, 2021, 783:146906, 14 pages.

Kirchgessner et al., "Estimate of methane emissions from the U.S. natural gas industry," U.S. Environmental Protection Agency, 2020, 29 pages.

Marcogaz, "Assessment of methane emissions for Gas Transmission & Distribution System Operators," Marcogaz: Technical Association of the European Natural Gas Industry, 2019, 64 pages.

Weller et al., "A National Estimate of Methane Leakage from Pipeline Mains in Natural Gas Local Distribution Systems," American Chemical Society, Environ. Sci. Technol., Jun. 2020, 54(14):8958-8967, 24 pages.

SAIP Examination Report in SAIP Appln. No. 123450482, mailed on Jan. 27, 2025, 10 pages, with English Translation.

* cited by examiner

ADJUSTING OIL AND GAS PRODUCTION BASED ON CARBON ENVIRONMENTAL IMPACT

TECHNICAL FIELD

This disclosure relates to a computer software program that interacts with oil and gas production equipment and, more specifically, based on carbon environmental impact of oil and gas pipeline leakage.

BACKGROUND

In the oil and gas industry, pipeline leakage during field production may cause damage on environments in a hydrocarbon reservoir. The leakage may be induced by corrosion in multiphase flow pipelines.

SUMMARY

The present disclosure describes methods and systems, including computer-implemented methods, computer program products, and computer systems for determining carbon environmental impact for oil and gas pipeline leakages and adjusting production operations. One computer-implemented method includes: determining, by one or more hardware processors, an amount of Equivalent Carbon Dioxide (ECO2) associated with a pipeline leak in a hydrocarbon reservoir; determining, by one or more hardware processors, a probability of failure of the pipeline leak in the hydrocarbon reservoir; determining, by one or more hardware processors, an environmental consequence factor of the pipeline leak in the hydrocarbon reservoir; determining, by one or more hardware processors, a severity factor of the pipeline leak in the hydrocarbon reservoir based on at least one of the amount of ECO2, the probability of failure, or the environmental consequence factor; and outputting, by one or more hardware processors, the severity factor in a user interface.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the subsequent description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following description is presented to enable any person skilled in the art to make and use the disclosed subject matter, and is provided in the context of one or more particular implementations. Various modifications to the disclosed implementations will be readily apparent to those skilled in the art, and the general principles defined in this disclosure may be applied to other implementations and applications without departing from scope of the disclosure. Thus, the present disclosure is not intended to be limited to the described or illustrated implementations, but is to be accorded the widest scope consistent with the principles and features disclosed in this disclosure.

In the oil and gas (O&G) industry, pipeline corrosion leaks can emit considerable amount of carbon emissions. Therefore, these leaks are a contributor to carbon emissions in climate change. However, there are limited knowledge on the comprehensive carbon estimation associated with leaks induced by corrosion in multiphase flow pipelines that include oil spillages and gas leaks. There are also additional carbon emission cost for the oil recovery processes and maintenance works that put the pipeline back to service.

This disclosure describes a system that estimates the Equivalent Carbon Dioxide (ECO2) associated with pipeline leaks and their environmental consequences. In some implementations, an ECO2 analysis system can determine an amount of ECO2 associated with a pipeline leak in a hydrocarbon reservoir. The ECO2 analysis system can determine a probability of failure of the pipeline leak in the hydrocarbon reservoir. The ECO2 analysis system can determine an environmental consequence factor of the pipeline leak in the hydrocarbon reservoir. The ECO2 analysis system can determine a severity factor of the pipeline leak in the hydrocarbon reservoir based on at least one of the amount of ECO2, the probability of failure, or the environmental consequence factor. The ECO2 analysis system can output the severity factor in a user interface. In some cases, based on the severity factor, the ECO2 analysis system can instruct the field equipment to alter or shut down the production operation in the hydrocarbon reservoir. FIGS. 1-5 and associated descriptions provide additional details of these implementations.

Techniques described herein produce one or more technical effects. In some cases, the techniques can provide an automated tool to monitor the parameters of field production in the reservoir in real time and estimate the carbon emission cost of potential leakages in real time. The techniques can also take into account of historical data in the estimation of the carbon emission impact. The techniques can further provide an interactive interface to simulate pipe leakage based on different operating parameters and predict the associated carbon emission cost. Moreover, the techniques can provide automatic control of field equipment and adjust field operations based on the estimated carbon emission cost.

Figure 1:
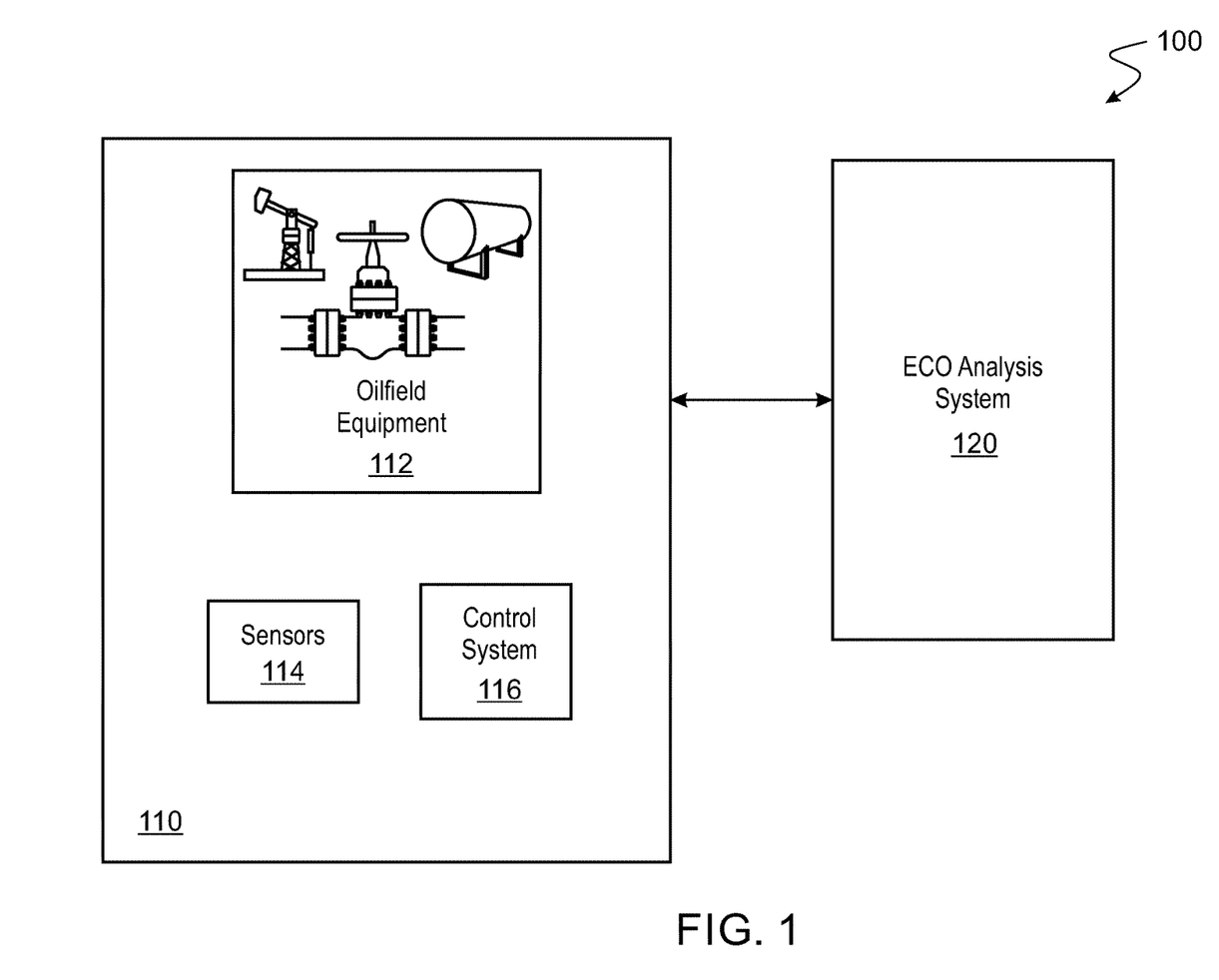
FIG. 1 is a schematic diagram showing an example oil and gas production system, according to an implementation.

FIG. 1 is a schematic diagram showing an example oil and gas production system 100, according to an implementation.

At a high level, the oil and gas production system 100 includes a field operation system 110 and an ECO2 analysis system 120.

The field operation system 110 includes a combination of oilfield equipment 112 that operate in a reservoir to produce oil. The oilfield equipment 112 include drilling rigs, pipelines, pumps, tanks, and other equipment used in the reservoir.

The field operation system 110 includes sensors 114. The sensors 114 include one or more hardware sensors that are used to measure operating parameters of the production operations. For example, the sensors 114 can include temperature sensors, pressure sensors, motion sensors, audio sensors, visual sensors, or any combination thereof. The sensors 114 can also include equipment that is configured to measure density, viscosity, or any other parameters.

The field operation system 110 includes a control system 116. The control system 116 includes controllers that controls the operation of the oilfield equipment 112. For example, the controllers can include valves that can be configured to open or close pipelines, switches that can turn on or off the drilling rigs, controllers that can adjust the speed of the pumps, or any combination thereof. In some implementations, part or all of the control system 116 can be implemented on corresponding equipment of the oilfield equipment 112.

The ECO2 analysis system 120 represents an application, a set of applications, software, software modules, hardware, or any combination thereof, that can be configured to determine the carbon emission cost of pipeline leaks in the field operation system 110. The ECO2 analysis system 120 can include an interactive user interface to provide carbon emission estimate based on different operating parameters.

In some implementations, the ECO2 analysis system 120 can obtain operating parameters from the sensors 114. The ECO2 analysis system 120 can determine a severity factor of the pipeline leak based on the operating parameters and stored data. In some cases, based on the severity factor, the ECO2 analysis system 120 can send command to the sensors 114 to change the monitoring frequency of the operations of the oilfield equipment 112. In some cases, based on the severity factor, the ECO2 analysis system 120 can also send command to the control system 116 to change or shut down the operations of the oilfield equipment 112. FIGS. 2-5 and associated descriptions provide additional details of these implementations.

Figure 2:
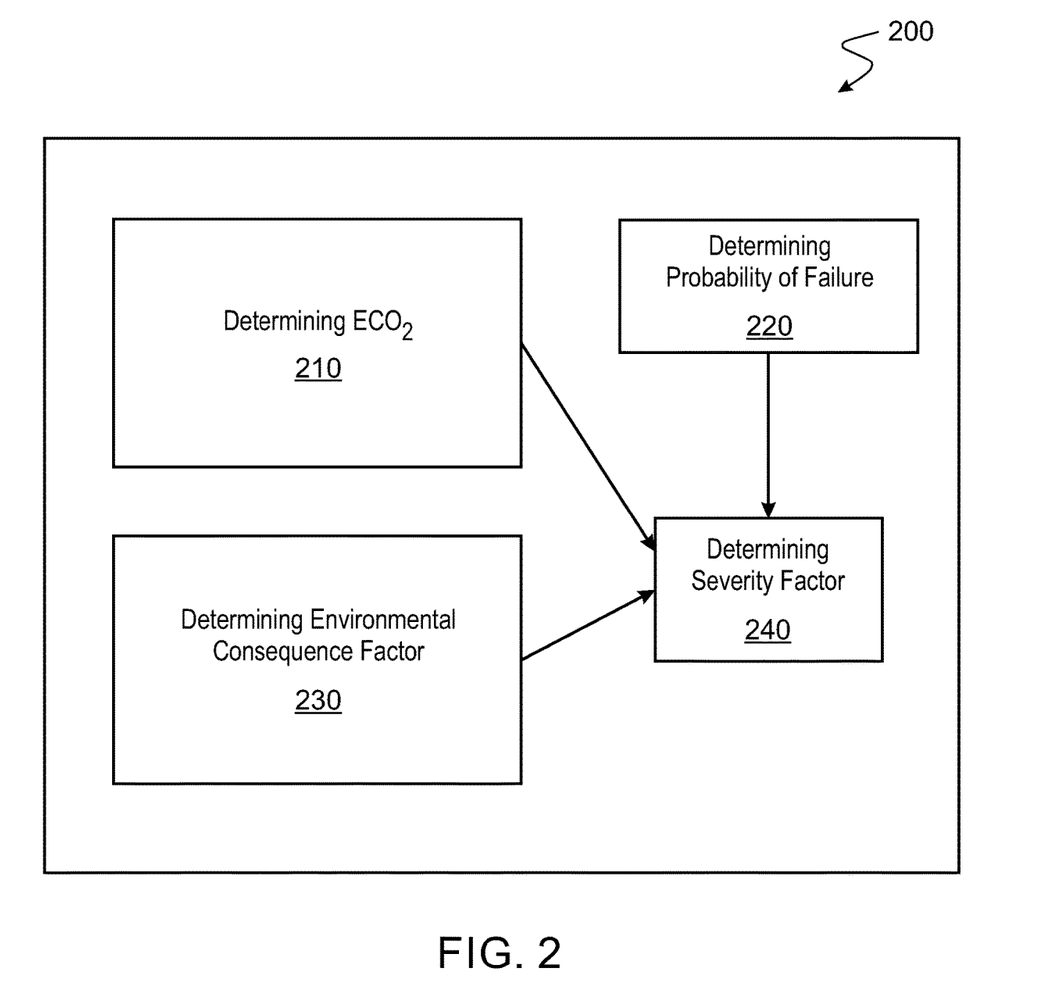
FIG. 2 illustrates a schematic diagram for determining a severity factor of pipeline leaks, according to an implementation.

FIG. 2 illustrates a schematic diagram 200 for determining a severity factor of pipeline leaks, according to an implementation. The calculations in diagram 200 can be performed by the ECO2 analysis system 120 in FIG. 1. It will be understood that the calculations in diagram 200 may be performed, for example, by other suitable system, environment, software, and hardware, or a combination of systems, environments, software, and hardware, as appropriate. In some implementations, various steps of the calculation processes in diagram 200 can be run in parallel, in combination, in loops, or in any order. As illustrated, the calculations in diagram 200 include steps 210, 220, 230, and 240.

In step 210, the total amount of ECO2 released to the atmosphere due to the leak in the pipeline is determined. In some implementations, the leakage's mass flow rate [kg/s] (Qm) can be calculated as a function of system properties: fluid density ($\rho$), fluid viscosity ($\mu$), and the hole area (A). The following equation can be used to calculate the mass flow rate:

$$Q_m = \rho \mu A \quad (1)$$

In some implementations, oil samples can be taken from the field operation and examined to determine the fluid density and the fluid viscosity. For example, the fluid density can be determined by using the hydrometer or digital density meter, and the fluid viscosity can be determined by using the viscometer.

The hole area can be estimated as the average leak hole size from the pipeline's failure history of the field. Alternatively or in combination, the area can be estimated from failure data in the industry.

In some cases, one or more of these parameters can be obtained by the ECO2 analysis system 120 automatically. For example, a sampling machine can take the oil sample from the field. The sampling machine can connect to the lab equipment discussed previously. The lab equipment can test the sample to determine the parameter and send the parameter to the ECO2 analysis system 120. Similarly, a database that stores the historical data of the pipeline's failure history of the particular field, failure data of the industry, or both, can be connected to the ECO2 analysis system 120. The ECO2 analysis system 120 can retrieve the data and perform statistical analysis to obtain the average leak hole size. Alternatively or in combination, one or more of these parameters can be provided to the ECO2 analysis system 120. For example, one or more of these parameters can be entered by a system administrator at the ECO2 analysis system 120, or sent to the ECO2 analysis system 120 from another computer device or server.

In some cases, the fluid density and the fluid viscosity can be obtained periodically, for example, monthly, yearly, or as configured by the ECO2 analysis system 120. Alternatively or in combination, the fluid density and the fluid viscosity can be obtained when there is a significant change of the pipeline condition. In some cases, the ECO2 analysis system 120 can determine that there is a significant change of the pipeline condition by comparing real time pipeline operating parameters with preconfigured threshold or historical data. When the ECO2 analysis system 120 determines that a significant change of the pipeline condition has occurred, the ECO2 analysis system 120 can instruct the sampling machine and test equipment to initiate the operation to obtain real time values of the fluid density and the fluid viscosity.

The percentage of oil evaporated directly can be calculated by using the following equation:

$$\text{Percentage evaporated} = [0.165(\% D) + 0.045(T-15)] \ln(t) \quad (2)$$

where % D is the percentage of oil (by weight) distilled at 180 Celsius degrees (° C.), T is the temperature in Celsius degree, and t is the time of leakage in minutes. In some cases, T can be obtained by the ECO2 analysis system 120 through a temperature sensor in the field. Alternatively or in combination, T and t can be obtained by the ECO2 analysis system 120 through a database storing historical data of the pipeline's failure history of the particular field, failure data of the industry, or both. The distillation data (% D) may be different for each well. In some cases, the distillation data (% D) for each well is stored in a database connected to the ECO2 analysis system 120 or otherwise provided to the ECO2 analysis system 120. Alternatively or in combination, the distillation data (% D) can be determined by laboratory crude characterization or from open literature.

Based on equations (1) and (2), mass of oil evaporated from a leakage can be determined by the following equation:

$$\text{mass evaporated [kg]} = Q_m \times t \times \text{Percentage evaporated} \quad (3)$$

Assuming Methane is the most dominant compound in the oil, the mass of oil evaporated obtained by Eq. (3) can be converted into its $CO_2$ equivalency $ECO_2$ by using the following equation:

$$ECO_2(kg) = \text{mass evaporated } [kg] \times 25 \frac{CO_2(kg)}{\text{Methane (kg)}} \quad (4)$$

wherein $25 \frac{CO_2(kg)}{\text{Methane (kg)}}$ represents that the ratio between $CO_2$ and Methane is 25.

In step 220, the probability of failure of the leak is determined. As discussed previously, in some cases, a database that stores the historical data of the pipeline's failure history of a particular field, failure data of the industry, or both, can be connected to the ECO2 analysis system 120. The ECO2 analysis system 120 can retrieve the data and perform statistical analysis to obtain the parameters related to the probability of failure. For example, the ECO2 analysis system 120 can determine the mean, median and average of each equipment in the field, and extrapolate on these results to determine the probability of failure of each equipment. The ECO2 analysis system 120 can aggregate the probability of failure of each equipment in a particular field to determine the probability of failure of the particular field, for example, by taking a maximum value, an average value, or other statistical analysis. In some cases, the probability of failure can be represented as a curve that shows different probabilities for different lengths of duration. Alternatively or combination, machine learning algorithms can be used to determine the probability of failure based on training data set obtained from the historical data discussed previously.

In step 230, the environmental consequence factor of the leak is determined. In some cases, an ecological sensitivity factor can be determined by using the following equation:

ecological sensitivity factor=sum(weight for each ecological sensitivity variable×level of the ecological sensitivity variable) (5)

Examples of the ecological sensitivity variables include the following:
Soil Type, which indicates the type of the soil of the leak (for example: Sand, Salt, Clay, etc.);
Water Ways, which indicates the shortest route for the spilled oil to reach a water source (m);
Terrain, which indicates the type of the terrain at the leak location (e.g. Desert, Forest, Mountain, Canyons, etc.);
Wildlife, which indicates the presence of the wildlife around the leak's location.

In one example, each ecological sensitivity variable has a value between 1-5 representing the corresponding level of the ecological sensitivity variable. The value can be assigned by a subject matter expert (SME) that evaluates the data of these ecological sensitivity variables (for example, the Soil Type and etc.) and assigns a corresponding value. Alternatively or in combination, the ECO2 analysis system 120 can automatically convert the data of these ecological sensitivity variables into a value between 1-5 by using a mapping table.

Each ecological sensitivity variable is also assigned a weight that represents the relative importance of the ecological sensitivity variable. The weight can be set according to an environmental policy configured at the ECO2 analysis system 120. The weight can also be configured and adjusted by a system administrator that operates the ECO2 analysis system 120.

Table 1 illustrates an example calculation of the ecological sensitivity factor based on the ecological sensitivity variables.

TABLE 1 example calculation of the ecological sensitivity factor

| Variables | level [1-5] | Weight | Weighted output |
|---|---|---|---|
| Soil Type | 2 | 20% | 0.4 |
| Water Ways | 4 | 40% | 1.6 |
| Terrain | 2 | 10% | 0.2 |
| Wildlife 3 | 3 | 30% | 0.9 |
| Total | | 100% | 3.1 |

In some cases, the environmental consequence factor of the leak can be determined by using the following equation:

environmental consequence factor=sum(weight for each environmental variable×level of the environmental variable) (6)

Examples of the environmental variable include the following:
Ecological sensitivity factor, as discussed previously;
Location, which indicates the desistence to the nearest human faculty (m);
Duration of Contamination, which indicates How many hours until the contamination is cleared (h);
Weather Condition, which indicates Wind speed at the area (m/h), Chance of rain (%), and Temperature (Co).

In one example, each environmental variable has a value between 1-5 representing the corresponding level of the environmental variable. The value can be calculated (such as Ecological sensitivity factor as discussed previously), or assigned by a subject matter expert (SME) that evaluates the data of these environmental variables (for example, the Weather Condition and etc.) and assigns a corresponding value. Alternatively or in combination, the ECO2 analysis system 120 can automatically convert the data of these environmental variables into a value between 1-5 by using a mapping table.

Each environmental variable is also assigned a weight that represents the relative importance of the environmental variable. The weight can be set according to an environmental policy configured at the ECO2 analysis system 120. The weight can also be configured and adjusted by a system administrator that operates the ECO2 analysis system 120.

Table 2 illustrates an example calculation of the environmental consequence factor based on the environmental variables.

TABLE 2 example calculation of the environmental consequence factor

| Variables | consequence level [1-5] | Weight | Weighted output |
|---|---|---|---|
| Ecological Sensitivity | 3.1 | 30% | 0.93 |
| Location | 3 | 20% | 0.6 |
| Duration of Contamination | 5 | 25% | 1.25 |
| Weather Condition | 2 | 25% | 0.5 |
| Total | | 100% | 3.28 |

In step 240, the severity factor is determined based on the $ECO_2$ determined in step 210, the probability of failure determined in step 220, and the environmental consequence factor determined in step 230.

In some cases, $ECO_2$ determined in step 210 can be converted to a consequence level by using a converting table. Table 3 illustrates an example converting table of $ECO_2$.

TABLE 3 example converting table of $ECO_2$.

| Amount of ECO2 Released to the Atmosphere | Scale |
|---|---|
| Below 1 Ton | 1 |
| 1 to 5 Ton | 2 |
| 5 to 15 Ton | 3 |
| 15 to 40 Ton | 4 |
| More than 40 Ton | 5 |

The combined consequence factor can be determined by using the following equation:

$$\text{combined consequence factor} = \text{weight for environmental consequence factor} \times \text{level of the consequence factor} + \text{scale of } ECO_2 \times \text{weight of } ECO_2 \quad (7)$$

The weight for environmental and $ECO_2$ can be set according to an environmental policy configured at the $ECO_2$ analysis system 120. The weights can also be configured and adjusted by a system administrator that operates the $ECO_2$ analysis system 120. Table 4 illustrates an example calculation of the combined consequence factor. In this example, the environmental consequence factor is 3.28, as determined using Table 2. The $ECO_2$ is determined to be between 15 to 40 tons and thus has a scale value of 4 according to Table 3.

TABLE 4 example calculation of the combined consequence factor

| Variables | consequence level [1-5] | Weight | Weighted output |
|---|---|---|---|
| Environmental consequence factor | 3.28 | 60% | 1.968 |
| ECO₂ Scale | 4 | 40% | 1.6 |
| Total | | 100% | 3.568 |

The severity factor can be determined by using the following equation:

$$\text{severity factor} = \text{probability of failure [in percentage]} \times \text{combined consequence factor} \quad (8)$$

In one example, the probability of failure as determined in step 220 is 0.66, the combined consequence factor as determined in Table 4 is 3.568. Accordingly, the severity factor for this example is 2.35488.

In some cases, the severity factor obtained in step 240 can be used to determine the severity level of the leak. Table 5 is an example list of possible severity levels and their corresponding environmental impacts.

TABLE 5 list of severity level

| Severity Level | Environmental Impact |
|---|---|
| 1 | No Impact |
| 2 | Mild Impact |
| 3 | Moderate Impact |
| 4 | High Impact |
| 5 | Extreme Impact |

Each severity level corresponds to the maximum value of the severity factor in this level. In the example discussed previously, the severity factor is 2.35488. Therefore, the corresponding severity level is Level 3.

In some cases, each severity level corresponds to a color code and one or more response actions. The color code and response actions can be part of an environmental operation policy that is configured by default of the ECO2 analysis system 120, or configured and updated by the system administrator. Table 6 is an example list of the response actions and color codes.

TABLE 6 list of response actions and color code.

| Severity Factor | Environmental Impact | Action Taken |
|---|---|---|
| 1 | No Impact | Green<br>Keep operating |
| 2 | Mild Impact | Yellow<br>in addition to above,<br>increase monitoring* |
| 3 | Moderate Impact | Orange<br>in addition to above,<br>increase monitoring*<br>install emergency shutdown system |
| 4 | High Impact | Purple<br>in addition to above:<br>increase monitoring*<br>initiate an Emergency alarm<br>for further analysis to<br>adjust the operation condition<br>to reduce the severity factor<br>allocate the resources for<br>the replacement or<br>maintenance to reduce the<br>severity factor (if the pipeline fails) |
| 5 | Extreme Impact | Red<br>Immediate shutdown by the<br>emergency shutdown<br>system (and take action to reduce<br>the severity factor for<br>example:<br>Related to 210 calculation:<br>Change the operating conditions<br>to reduce the amount of<br>ECO2 released to the atmosphere<br>Related to 220 calculation:<br>replace the pipeline to reduce<br>the probability of failure<br>Related to 230 calculation:<br>Relocate the pipeline reduce its<br>environmental consequences |

In some cases, the ECO2 analysis system 120 can use Table 6, or other environmental operation policy to determine a response action based on the severity level that corresponds to the severity factor determined at step 240. For example, if the severity level is determined to be level 2, the ECO2 analysis system 120 can increase the monitoring of the pipeline. The ECO2 analysis system 120 can change the configured period for the sensors that obtain field parameters to increase the reporting frequencies of these sensors. The ECO2 analysis system 120 can also change the configured period for the sampling machine and testing equipment discussed previously in step 210 to increase the frequencies of sample collection and determination. In some cases, the ECO2 analysis system 120 can send command to audiovisual monitoring equipment in the field to turn on the audiovisual monitoring equipment so that they can provide real time audiovisual input of the operations of the pipeline. Examples of the audiovisual monitoring equipment include: ultrasonic sensors, acoustic emission sensors, guided waves monitoring tools, and the like.

If the severity level is determined to be level 3, the ECO2 analysis system 120 can further send commands to the audiovisual monitoring equipment to increase the monitoring frequency of these equipment. The ECO2 analysis system 120 can further check whether emergency shutdown system has been installed and send instructions to the field support team to install the emergency shutdown system if it is not installed.

If the severity level is determined to be level 4, the ECO2 analysis system 120 can send commands to the audiovisual monitoring equipment to further increase the monitoring frequency of these equipment. The ECO2 analysis system 120 can also initiate emergency alarm that would prompt further analysis to adjust the operation condition to reduce the severity factor. In some cases, the ECO2 analysis system 120 can send command to the production equipment in the field to adjust operating parameters, including for example, to the pump and drilling rigs to change the operating speed of the pump or the speed of the drilling rigs. The ECO2 analysis system 120 can also send command to the pressure control valves, flow control valves, or level control valves to adjust the operating parameters If the severity level is determined to be level 5, the ECO2 analysis system 120 can send commands to the emergency shutdown system to shut down the production. The emergency shutdown system can include controllers that is configured to shut down the pumps and the drilling rigs. For example, the emergency shutdown system can close the emergency valves (ZV) and stop the pumps and drilling rigs in a production well. The emergency shutdown system can also send commands to venting, draining, and pressure relief valve to open these valves and stop the pressure build up.

The ECO2 analysis system 120 can send suggested actions to the field supporting team to adjust the operating conditions that affect these parameters. For example, the pipeline can be relocated to reduce the environment consequence factors.

In addition, the ECO2 analysis system 120 can output alarms corresponding to the severity level. For example, as discussed previously, each severity level can be configured with a corresponding color code. The ECO2 analysis system 120 can display the color code on a user interface of the analysis system 120 corresponding to the determined severity level. The ECO2 analysis system 120 can also trigger an audio alarm. The audio alarm can have different audio pattern and volume corresponding to different severity levels. The ECO2 analysis system 120 can also trigger the audio alarm with the pattern and volume corresponding to the determined severity level.

Figure 3:
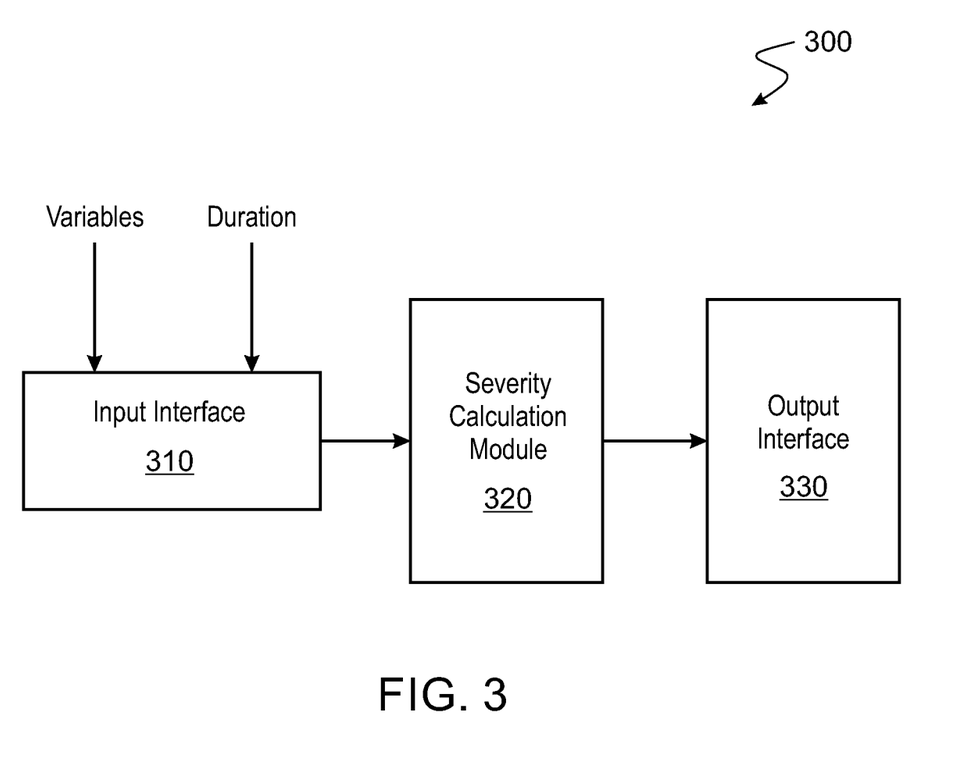
FIG. 3 is a schematic diagram 300 illustrating a user interaction of the ECO2 analysis system, according to an implementation.

In some case, the ECO2 analysis system 120 perform an interactive simulation to predict the total carbon cost of a leakage and present an associated severity factor. FIG. 3 is a schematic diagram 300 illustrating a user interaction of the ECO2 analysis system 120, according to an implementation.

The ECO2 analysis system 120 includes input interface 310, severity calculation module 320, and output interface 330. A user can use the input interface 310 to input values of different variables as discussed previously. The user can also use the input interface 310 to input a duration. The severity calculation module 320 can calculate the severity factor based on these inputs. The output interface 330 can output the severity factor, and the corresponding response actions discussed previously. In some cases, the output interface 330 can also output the intermediate results discussed previously, for example, the amount of ECO2, the probability of failure, and the environmental consequence factors. In some cases, if the user sets the value of the duration as infinite, the output interface 330 can output a curve that illustrate the change of the results over time, such as the severity factor over time and the amount of ECO2 over time.

Figure 4:
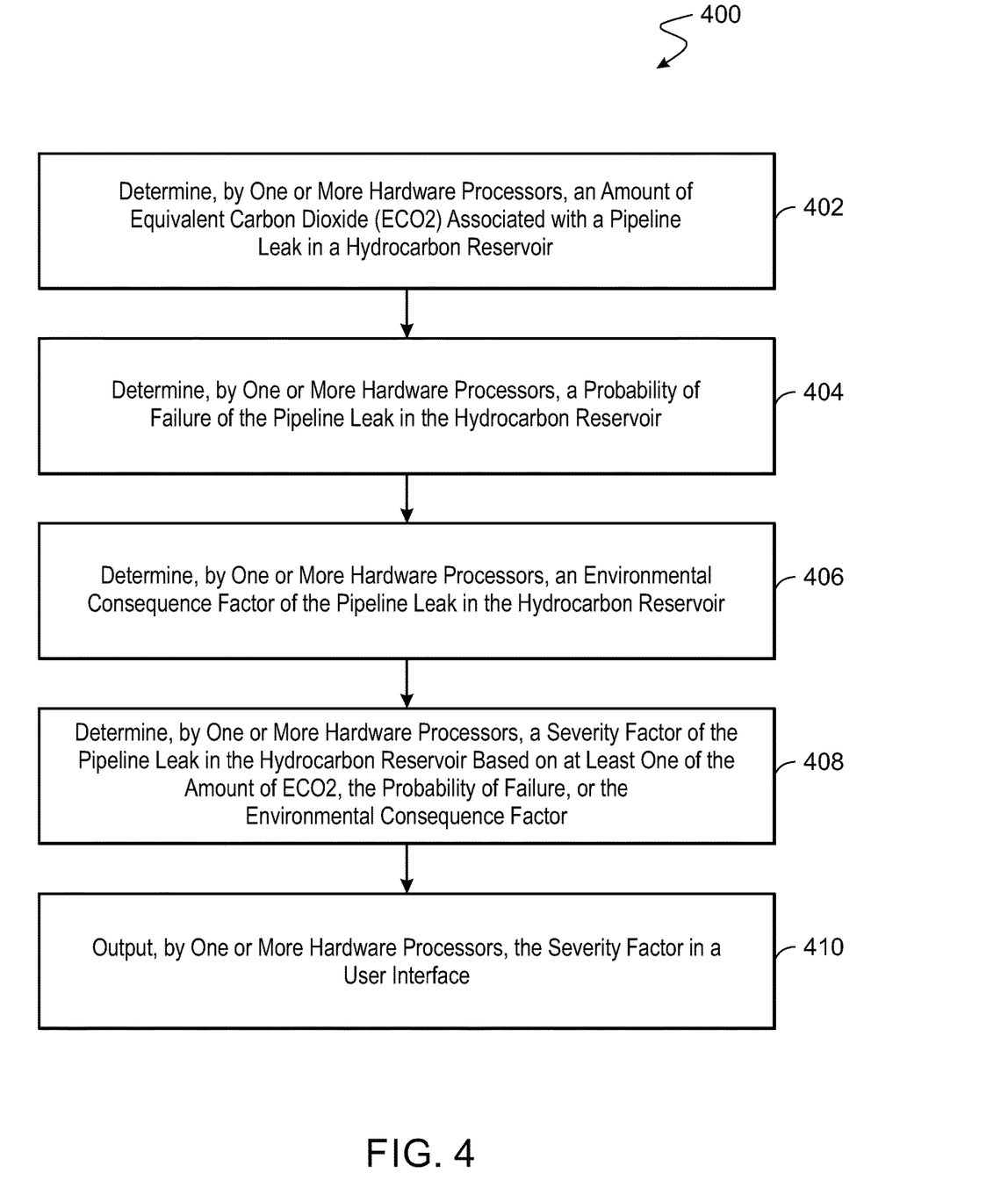
FIG. 4 illustrates an example method for adjusting oil and gas production operation based on carbon environmental impact, according to an implementation.

FIG. 4 illustrates an example method 400 for adjusting oil and gas production operation based on carbon environmental impact, according to an implementation. For clarity of presentation, the description that follows generally describes method 400 in the context of FIGS. 1-3 and 5. The method 400 can be performed by the ECO2 analysis system 120 in FIG. 1 and other suitable system, environment, software, and hardware, or a combination of systems, environments, software, and hardware, as appropriate. In some implementations, various steps of the method 400 can be run in parallel, in combination, in loops, or in any order.

At 402, an amount of Equivalent Carbon Dioxide (ECO2) associated with a pipeline leak in a hydrocarbon reservoir is determined. At 404, a probability of failure of the pipeline leak in the hydrocarbon reservoir is determined. At 406, an environmental consequence factor of the pipeline leak in the hydrocarbon reservoir is determined. At 408, a severity factor of the pipeline leak in the hydrocarbon reservoir is determined based on at least one of the amount of ECO2, the probability of failure, or the environmental consequence factor. At 410, the severity factor is outputted in a user interface.

Figure 5:
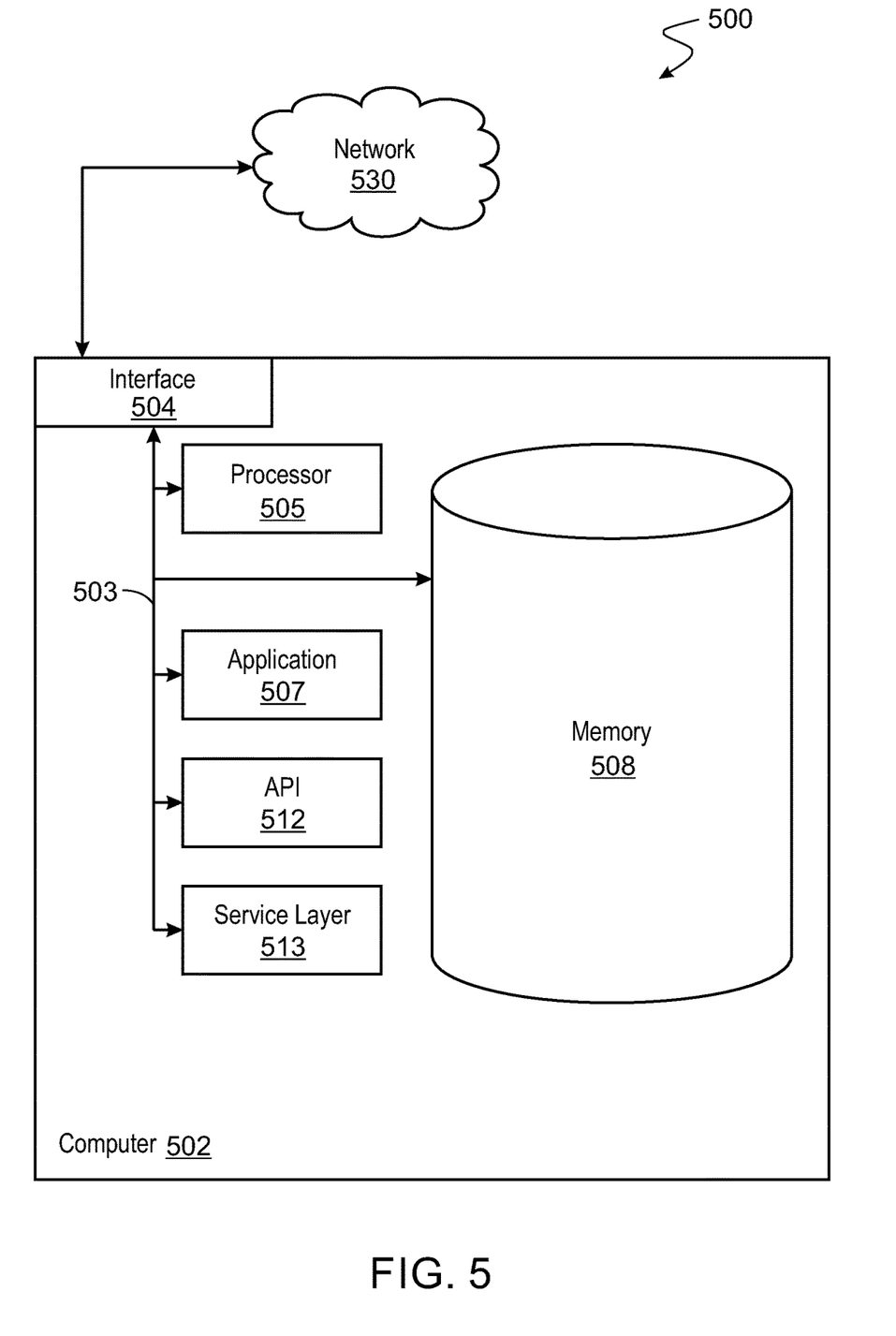
FIG. 5 is a high level architecture block diagram of a computer system based on the methods described in this disclosure, according to an implementation.

FIG. 5 is a high-level architecture block diagram of a computer system 500 based on the methods described in this disclosure, according to an implementation. At a high level, the illustrated system 500 includes a computer 502 coupled with a network 530. The system 500 can be used to implement the ECO2 analysis system 120 discussed previously.

The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 530 facilitates communication between the computer 502 and other components, for example, components that obtain observed data for a location and transmit the observed data to the computer 502. The network 530 can be a wireless or a wireline network. The network 530 can also be a memory pipe, a hardware connection, or any internal or external communication paths between the components.

The computer 502 includes a computing system configured to perform the method as described in this disclosure. In some cases, the method can be implemented in an executable computing code, for example, C/C++ executable codes. In some cases, the computer 502 can include a standalone LINUX system that runs batch applications. In some cases, the computer 502 can include mobile or personal computers.

The computer 502 may comprise a computer that includes an input device, such as a keypad, keyboard, touch screen, microphone, speech recognition device, other devices that can accept user information, or an output device that conveys information associated with the operation of the computer 502, including digital data, visual or audio information, or a graphic user interface (GUI).

The computer 502 can serve as a client, network component, a server, a database, or other persistency, or any other component of the system 500. In some implementations, one or more components of the computer 502 may be configured to operate within a cloud-computing-based environment.

At a high level, the computer 502 is an electronic computing device operable to receive, transmit, process, store, or manage data and information associated with the system 500. According to some implementations, the computer 502 may also include, or be communicably coupled with, an application server, e-mail server, web server, caching server, streaming data server, business intelligence (BI) server, or other server.

The computer 502 can receive requests over network 530 from a client application (for example, executing on another computer 502) and respond to the received requests by processing said requests in an appropriate software application. In addition, requests may also be sent to the computer 502 from internal users (for example, from a command console), external or third parties, or other automated applications.

Each of the components of the computer 502 can communicate using a system bus 503. In some implementations, any or all the components of the computer 502, both hardware or software, may interface with each other or the interface 504, over the system bus 503, using an application programming interface (API) 512 or a service layer 513. The API 512 may include specifications for routines, data structures, and object classes. The API 512 may be either computer language-independent or -dependent and refer to a complete interface, a single function, or even a set of APIs. The service layer 513 provides software services to the computer 502 or the system 500. The functionality of the computer 502 may be accessible for all service consumers using this service layer. Software services, such as those provided by the service layer 513, provide reusable, defined business functionalities, through a defined interface. For example, the interface may be software written in JAVA, C++, or suitable language providing data in Extensible Markup Language (XML) format. While illustrated as an integrated component of the computer 502, alternative implementations may illustrate the API 512 or the service layer 513 as stand-alone components in relation to other components of the computer 502 or the system 500. Moreover, any or all parts of the API 512 or the service layer 513 may be implemented as sub-modules of another software module, enterprise application, or hardware module, without departing from the scope of this disclosure.

The computer 502 includes an interface 504. Although illustrated as a single interface 504 in FIG. 5, two or more interfaces 504 may be used according to particular needs, desires, or particular implementations of the computer 502 or system 500. The interface 504 is used by the computer 502 for communicating with other systems in a distributed environment—including within the system 500 connected to the network 530 (whether illustrated or not). Generally, the interface 504 comprises logic encoded in software or hardware in a suitable combination and operable to communicate with the network 530. More specifically, the interface 504 may comprise software supporting one or more communication protocols associated with communications such that the network 530 or interface's hardware is operable to communicate physical signals within and outside of the illustrated system 500.

The computer 502 includes a processor 505. Although illustrated as a single processor 505 in FIG. 5, two or more processors may be used according to particular needs, desires, or particular implementations of the computer 502 or the system 500. Generally, the processor 505 executes instructions and manipulates data to perform the operations of the computer 502. Specifically, the processor 505 executes the functionality required for processing geophysical data.

The computer 502 also includes a memory 508 that holds data for the computer 502 or other components of the system 500. Although illustrated as a single memory 508 in FIG. 5, two or more memories may be used according to particular needs, desires, or particular implementations of the computer 502 or the system 500. While memory 508 is illustrated as an integral component of the computer 502, in alternative implementations, memory 508 can be external to the computer 502 or the system 500.

The application 507 is a software engine providing functionality according to particular needs, desires, or particular implementations of the computer 502 or the system 500, particularly with respect to functionality required for processing geophysical data. For example, application 507 can serve as one or more components or applications described in FIGS. 1-4. Further, although illustrated as a single application 507, the application 507 may be implemented as multiple applications 507, on the computer 502. In addition, although illustrated as integral to the computer 502, in alternative implementations, the application 507 can be external to the computer 502 or the system 500.

There may be any number of computers 502 associated with, or external to, the system 500 and communicating over network 530. Further, the terms "client," "user," and other appropriate terminology may be used interchangeably, as appropriate, without departing from the scope of this disclosure. Moreover, this disclosure contemplates that many users may use one computer 502, or that one user may use multiple computers 502.

In some implementations, the described methodology can be configured to send messages, instructions, or other communications to a computer-implemented controller, database, or other computer-implemented system to dynamically initiate control of, control, or cause another computer-implemented system to perform a computer-implemented operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, activate/deactivate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementations, the output of the described methodology can be used to dynamically influence, direct, control, influence, or manage tangible, real-world equipment related to hydrocarbon production, analysis, and recovery or for other purposes consistent with this disclosure. For example, the response actions for severity factor can include sending command to the field to modify a wellbore trajectory, increase/decrease speed of or stop/start a hydrocarbon drill; activate/deactivate an alarm (such as, a visual, auditory, or voice alarm), or to affect refinery or pumping operations (for example, stop, restart, accelerate, or reduce). Other examples can include alerting geo-steering and directional drilling staff when underground obstacles have been detected (such as, with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Described implementations of the subject matter can include one or more features, alone or in combination.

For example, in a first implementation, a computer-implemented method comprising: determining, by one or more hardware processors, an amount of Equivalent Carbon Dioxide (ECO2) associated with a pipeline leak in a hydrocarbon reservoir; determining, by one or more hardware processors, a probability of failure of the pipeline leak in the hydrocarbon reservoir; determining, by one or more hardware processors, an environmental consequence factor of the pipeline leak in the hydrocarbon reservoir; determining, by one or more hardware processors, a severity factor of the pipeline leak in the hydrocarbon reservoir based on at least one of the amount of ECO2, the probability of failure, or the environmental consequence factor; and outputting, by one or more hardware processors, the severity factor in a user interface.

The foregoing and other implementations can each, optionally, include one or more of the following features, alone or in combination:

A first aspect, combinable with the general implementation, where the ECO2 is determined based on at least one of a fluid density or a fluid viscosity of oil in the hydrocarbon reservoir.

A second aspect, combinable with any of the previous or subsequent aspects, where the ECO2 is determined based on distill information of oil in the hydrocarbon reservoir.

A third aspect, combinable with any of the previous or subsequent aspects, where the environmental consequence factor is determined based on at least one of soil type data, water ways data, terrain data, or wildlife data of the hydrocarbon reservoir.

A fourth aspect, combinable with any of the previous or subsequent aspects, where the severity factor is further determined based on a weight of the amount of ECO2, a weight of the probability of failure, or a weight of the environmental consequence factor.

A fifth aspect, combinable with any of the previous or subsequent aspects, where the method further comprises adjusting a monitoring frequency of the hydrocarbon reservoir based on the severity factor.

A sixth aspect, combinable with any of the previous aspects, where the method further comprises shutting down a production operation of the hydrocarbon reservoir based on the severity factor.

In a second implementation, a non-transitory computer-readable medium storing instructions which, when executed, cause a computer to perform operations comprising: determining an amount of Equivalent Carbon Dioxide (ECO2) associated with a pipeline leak in a hydrocarbon reservoir; determining a probability of failure of the pipeline leak in the hydrocarbon reservoir; determining an environmental consequence factor of the pipeline leak in the hydrocarbon reservoir; determining a severity factor of the pipeline leak in the hydrocarbon reservoir based on at least one of the amount of ECO2, the probability of failure, or the environmental consequence factor; and outputting the severity factor in a user interface.

The foregoing and other implementations can each, optionally, include one or more of the following features, alone or in combination:

A first aspect, combinable with the general implementation, where the ECO2 is determined based on at least one of a fluid density or a fluid viscosity of oil in the hydrocarbon reservoir.

A second aspect, combinable with any of the previous or subsequent aspects, where the ECO2 is determined based on distill information of oil in the hydrocarbon reservoir.

A third aspect, combinable with any of the previous or subsequent aspects, where the environmental consequence factor is determined based on at least one of soil type data, water ways data, terrain data, or wildlife data of the hydrocarbon reservoir.

A fourth aspect, combinable with any of the previous or subsequent aspects, where the severity factor is further determined based on a weight of the amount of ECO2, a weight of the probability of failure, or a weight of the environmental consequence factor.

A fifth aspect, combinable with any of the previous or subsequent aspects, where the operation further comprise adjusting a monitoring frequency of the hydrocarbon reservoir based on the severity factor.

A sixth aspect, combinable with any of the previous aspects, where the operation further comprise shutting down a production operation of the hydrocarbon reservoir based on the severity factor.

In a third implementation, a device comprising: at least one hardware processor; and a non-transitory computer-readable storage medium coupled to the at least one hardware processor and storing programming instructions for execution by the at least one hardware processor, where the programming instructions, when executed, cause the at least one hardware processor to perform operations comprising: determining an amount of Equivalent Carbon Dioxide (ECO2) associated with a pipeline leak in a hydrocarbon reservoir; determining a probability of failure of the pipeline leak in the hydrocarbon reservoir; determining an environmental consequence factor of the pipeline leak in the hydrocarbon reservoir; determining a severity factor of the pipeline leak in the hydrocarbon reservoir based on at least one of the amount of ECO2, the probability of failure, or the environmental consequence factor; and outputting the severity factor in a user interface.

The foregoing and other implementations can each, optionally, include one or more of the following features, alone or in combination:

A first aspect, combinable with the general implementation, where the ECO2 is determined based on at least one of a fluid density or a fluid viscosity of oil in the hydrocarbon reservoir.

A second aspect, combinable with any of the previous or subsequent aspects, where the ECO2 is determined based on distill information of oil in the hydrocarbon reservoir.

A third aspect, combinable with any of the previous or subsequent aspects, where the environmental consequence factor is determined based on at least one of soil type data, water ways data, terrain data, or wildlife data of the hydrocarbon reservoir.

A fourth aspect, combinable with any of the previous or subsequent aspects, where the severity factor is further determined based on a weight of the amount of ECO2, a weight of the probability of failure, or a weight of the environmental consequence factor.

A fifth aspect, combinable with any of the previous or subsequent aspects, where the operation further comprise adjusting a monitoring frequency of the hydrocarbon reservoir based on the severity factor.

A sixth aspect, combinable with any of the previous aspects, where the operation further comprise shutting down a production operation of the hydrocarbon reservoir based on the severity factor.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), a FPGA (field programmable gate array), or an ASIC (application-specific integrated circuit). In some implementations, the data processing apparatus or special purpose logic circuitry may be hardware-based or software-based. The apparatus can optionally include code that creates an execution environment for computer programs, for example, code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, or IOS.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random-access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business or dynamic information, and any other appropriate information including any parameters, variables, algorithms, instructions, rules, constraints, or references thereto. Additionally, the memory may include any other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20, and all or a portion of the Internet. The network may communicate with, for example, Internet Protocol (IP) packets, Frame Relay frames, Asynchronous Transfer Mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and software, may interface with each other or the interface using an application programming interface (API) or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API or service layer may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any disclosure or on the scope of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation or integration of various system modules and components in the implementations described previously should not be understood as requiring such separation or integration in all implementations, and it should be understood that the described program components and systems can generally be integrated together in a single software product or packaged into multiple software products.

Accordingly, the previous description of example implementations does not define or constrain this disclosure. Other changes, substitutions, and alterations are also possible without departing from the spirit and scope of this disclosure.

What is claimed is:

1. A computer-implemented method, comprising:
   determining, by one or more hardware processors, an amount of Equivalent Carbon Dioxide (ECO2) associated with a pipeline leak in a hydrocarbon reservoir;
   determining, by the one or more hardware processors, a probability of failure of the pipeline leak in the hydrocarbon reservoir;
   determining, by the one or more hardware processors, an environmental consequence factor of the pipeline leak in the hydrocarbon reservoir;
   determining, by the one or more hardware processors, a severity factor of the pipeline leak in the hydrocarbon reservoir based on at least one of the amount of ECO2, the probability of failure, or the environmental consequence factor;
   outputting, by the one or more hardware processors, the severity factor in a user interface; and
   shutting down a production operation of the hydrocarbon reservoir based on the severity factor.

2. The computer-implemented method of claim 1, wherein the amount of ECO2 is determined based on at least one of a fluid density or a fluid viscosity of oil in the hydrocarbon reservoir.

3. The computer-implemented method of claim 1, wherein the amount of ECO2 is determined based on distill information of oil in the hydrocarbon reservoir.

4. The computer-implemented method of claim 1, wherein the environmental consequence factor is determined based on at least one of soil type data, water ways data, terrain data, or wildlife data of the hydrocarbon reservoir.

5. The computer-implemented method of claim 1, wherein the severity factor is further determined based on a weight of the amount of ECO2, a weight of the probability of failure, or a weight of the environmental consequence factor.

6. The computer-implemented method of claim 1, further comprising: adjusting a monitoring frequency of the hydrocarbon reservoir based on the severity factor.

7. A device, comprising:
   at least one hardware processor; and
   a non-transitory computer-readable storage medium coupled to the at least one hardware processor and storing programming instructions for execution by the at least one hardware processor, wherein the programming instructions, when executed, cause the at least one hardware processor to perform operations comprising:
   determining an amount of Equivalent Carbon Dioxide (ECO2) associated with a pipeline leak in a hydrocarbon reservoir;
   determining a probability of failure of the pipeline leak in the hydrocarbon reservoir;
   determining an environmental consequence factor of the pipeline leak in the hydrocarbon reservoir;
   determining a severity factor of the pipeline leak in the hydrocarbon reservoir based on at least one of the amount of ECO2, the probability of failure, or the environmental consequence factor;
   outputting the severity factor in a user interface; and
   shutting down a production operation of the hydrocarbon reservoir based on the severity factor.

8. The device of claim 7, wherein the amount of ECO2 is determined based on at least one of a fluid density or a fluid viscosity of oil in the hydrocarbon reservoir.

9. The device of claim 7, wherein the amount of ECO2 is determined based on distill information of oil in the hydrocarbon reservoir.

10. The device of claim 7, wherein the environmental consequence factor is determined based on at least one of soil type data, water ways data, terrain data, or wildlife data of the hydrocarbon reservoir.

11. The device of claim 7, wherein the severity factor is further determined based on a weight of the amount of ECO2, a weight of the probability of failure, or a weight of the environmental consequence factor.

12. The device of claim 7, the operations further comprising: adjusting a monitoring frequency of the hydrocarbon reservoir based on the severity factor.

13. A non-transitory computer-readable medium storing instructions which, when executed, cause a computing device to perform operations comprising:
   determining an amount of Equivalent Carbon Dioxide (ECO2) associated with a pipeline leak in a hydrocarbon reservoir;
   determining a probability of failure of the pipeline leak in the hydrocarbon reservoir;
   determining an environmental consequence factor of the pipeline leak in the hydrocarbon reservoir;
   determining a severity factor of the pipeline leak in the hydrocarbon reservoir based on at least one of the amount of ECO2, the probability of failure, or the environmental consequence factor;
   outputting the severity factor in a user interface; and
   shutting down a production operation of the hydrocarbon reservoir based on the severity factor.

14. The non-transitory computer-readable medium of claim 13, wherein the amount of ECO2 is determined based on at least one of a fluid density or a fluid viscosity of oil in the hydrocarbon reservoir.

15. The non-transitory computer-readable medium of claim 13, wherein the amount of ECO2 is determined based on distill information of oil in the hydrocarbon reservoir.

16. The non-transitory computer-readable medium of claim 13, wherein the environmental consequence factor is determined based on at least one of soil type data, water ways data, terrain data, or wildlife data of the hydrocarbon reservoir.

17. The non-transitory computer-readable medium of claim 13, wherein the severity factor is further determined based on a weight of the amount of ECO2, a weight of the probability of failure, or a weight of the environmental consequence factor.

18. The non-transitory computer-readable medium of claim 13, the operations further comprising: adjusting a monitoring frequency of the hydrocarbon reservoir based on the severity factor.

* * * * *